(12) United States Patent
Shi (10) Patent No.: US 9,531,271 B2
(45) Date of Patent: Dec. 27, 2016

(54) SPREAD SPECTRUM POWER CONVERTER (75) Inventor: Justin Shi, Ann Arbor, MI (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 655 days.

(21) Appl. No.: 13/406,337

(22) Filed: Feb. 27, 2012

(65) Prior Publication Data

US 2013/0134953 A1 May 30, 2013

Related U.S. Application Data (60) Provisional application No. 61/564,632, filed on Nov. 29, 2011.

(51) Int. Cl.

| G05F 1/575 | (2006.01) |
|---|---|
| H02M 3/156 | (2006.01) |
| H02M 1/00 | (2006.01) |
| H02M 3/158 | (2006.01) |
| G05F 1/56 | (2006.01) |

(52) U.S. Cl.
CPC ............ *H02M 3/1584* (2013.01); *G05F 1/56* (2013.01); *H02M 2001/0045* (2013.01)

(58) Field of Classification Search
CPC ............................................ H02M 2001/0045
USPC .......................... 323/280, 273, 282, 351, 371
See application file for complete search history.

(56) References Cited

U.S. PATENT DOCUMENTS

| 6,366,070 B1 * | 4/2002 | Cooke et al. ................ 323/284 |
|---|---|---|
| 6,442,047 B1 * | 8/2002 | Cohen ............................ 363/17 |
| 7,071,660 B2 * | 7/2006 | Xu ........................ H02M 3/156 323/266 |
| 7,218,085 B2 * | 5/2007 | Abedinpour et al. ........ 323/282 |
| 7,688,046 B2 * | 3/2010 | Li et al. ......................... 323/266 |
| 7,952,508 B2 * | 5/2011 | Crespi ..................... H03F 3/217 341/152 |
| 8,373,396 B2 * | 2/2013 | Huang et al. .................. 323/271 |
| 8,471,542 B2 * | 6/2013 | Lipiansky ................. G06F 1/26 323/272 |
| 8,772,967 B1 * | 7/2014 | Ikriannikov et al. ........... 307/82 |
| 2002/0121883 A1 * | 9/2002 | Bartenschlager et al. .... 323/269 |
| 2004/0076024 A1 * | 4/2004 | Liu et al. ........................ 363/41 |
| 2005/0116695 A1 * | 6/2005 | Morioka ............. H02M 3/1584 323/272 |
| 2006/0198165 A1 * | 9/2006 | O'Driscoll et al. ............ 363/13 |
| 2010/0176782 A1 * | 7/2010 | Kudo .................. H02M 3/1584 323/282 |
| 2010/0289466 A1 * | 11/2010 | Telefus ........................ 323/282 |

(Continued)

OTHER PUBLICATIONS

Maxim Integrated Products Datasheet, Tiny 500mA, 4MHz/2MHx Synchronous Step-Down DC-DC Converters, MAX8640Y/MAX8640Z, 19-3997; Rev 2; Oct. 2007, pp. 1-11.

(Continued)

*Primary Examiner* — Timothy J Dole
*Assistant Examiner* — Sisay G Tiku
(74) *Attorney, Agent, or Firm* — Hauptman Ham, LLP (57) ABSTRACT

A power converter includes a first stage voltage modulator configured to receive an input voltage and provide a modulated voltage. A second stage power converter is configured to receive the modulated voltage and vary a switching frequency of the second stage power converter in accordance with the modulated voltage to provide an output voltage.

19 Claims, 7 Drawing Sheets

(56) References Cited

U.S. PATENT DOCUMENTS

| | | | |
|---|---|---|---|
| 2012/0223691 A1* | 9/2012 | Weinstein | H02M 1/44 323/283 |
| 2012/0306477 A1* | 12/2012 | Daigle et al. | 324/123 R |
| 2015/0177754 A1* | 6/2015 | Mengad | H02M 3/156 323/280 |

OTHER PUBLICATIONS

Texas Instruments Datasheets, TPS62230 and TPS62231, 2MHz/3MHz Ultra Small Step Down Converter in 1x1.5 SON Package, Apr. 2010, pp. 1-32.
RichTek Datasheet, RT8020, Dual High-Efficiecy Pwm Step-Down DC/DC Converter, Aug. 2007, pp. 1-14.
RichTek Datasheet, RT8010/A, 1.5 MHz, 1A, High Efficiency PWM Step-Down DC/DC Converter, Aug. 2007, pp. 1-15.

* cited by examiner

SPREAD SPECTRUM POWER CONVERTER

CROSS-REFERENCE TO RELATED APPLICATION

The present application claims priority of U.S. Provisional Patent Application No. 61/564,632 filed on Nov. 29, 2011, which is incorporated herein by reference in its entirety.

TECHNICAL FIELD

The present disclosure relates generally to an integrated circuit and, more particularly, a power converter.

BACKGROUND

Some power converters switch complementary output drivers to convert one voltage to another. The frequency of the switching is dependent on the requirements of the system, the external components used, and the respective voltage levels. For a fixed input voltage and output voltage, the frequency and duty cycle of the switching in the power converter are usually fixed.

However, switching converters causes a phenomenon called electromagnetic interference (EMI). For example, frequency peaks are observed in the frequency spectrum at multiples of the switching frequency. This interference can cause unexpected behavior in other circuits and components in the system and degrade the performance of the other components.

BRIEF DESCRIPTION OF THE DRAWINGS

Reference is now made to the following descriptions taken in conjunction with the accompanying drawings, in which.

DETAILED DESCRIPTION

The making and using of various embodiments are discussed in detail below. It should be appreciated, however, that the present disclosure provides many applicable inventive concepts that can be embodied in a wide variety of specific contexts. The specific embodiments discussed are merely illustrative of specific ways to make and use, and do not limit the scope of the disclosure.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1:
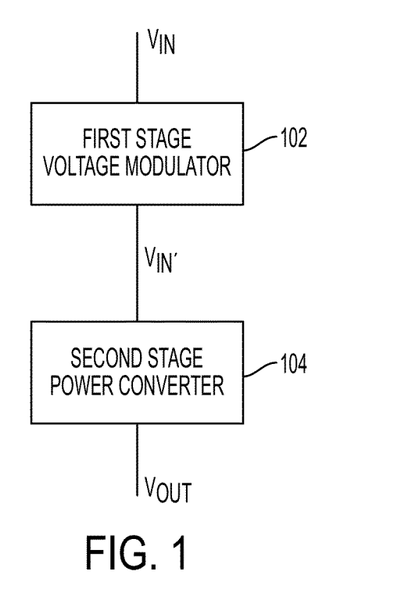
FIG. 1 is a block diagram of an exemplary spread spectrum power converter according to some embodiments.

FIG. 1 is a block diagram of an exemplary spread spectrum power converter according to some embodiments. A first stage voltage modulator 102 modulates an input voltage Vin to provide Vin'. For example, the modulated voltage Vin' can have a saw-tooth (triangular) or sinusoidal shape with a modulation frequency fm. The first stage modulator 102 can be viewed as a pre-modulator which modulates the input voltage Vin, either in a periodic or random fashion. A digital or analog input to the first stage voltage modulator 102 can be used to control the modulation, e.g., frequency, amplitude, etc.

The modulated voltage Vin' is sent to a second stage power converter 104. The power converter 104 adjusts the switching frequency $f_{SW}$ and duty cycle of its control signal depending on Vin'. This changes (i.e., spreads) the spectrum of an output voltage Vout to reduce EMI while keeping Vout in a specified range. In some embodiments, fm is relatively lower than $f_{SW}$. For example, when $f_{SW}$ is in the MHz range, fm can be in the kHz range in some applications. Vout is lower than Vin in some embodiments.

Figure 2A:
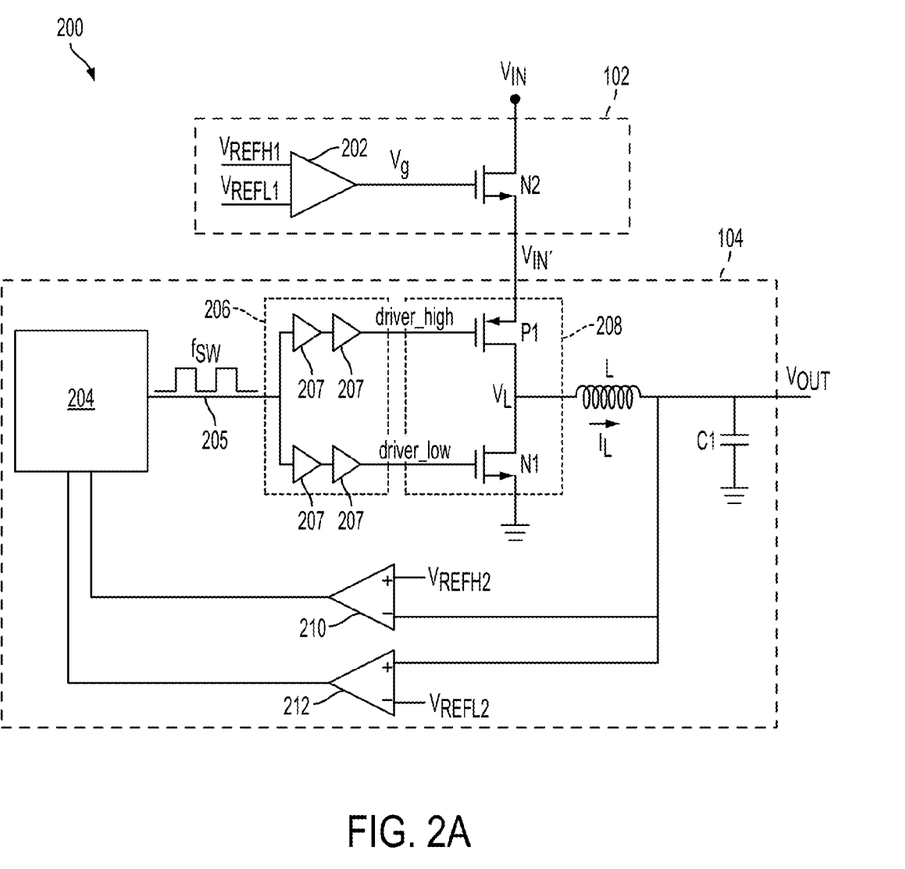
FIG. 2A is a schematic diagram of the exemplary spread spectrum power converter in FIG. 1 according to some embodiments.

FIG. 2A is a schematic diagram of the exemplary spread spectrum power converter in FIG. 1 according to some embodiments. For the spread spectrum power converter 200, the first stage voltage modulator 102 includes a voltage generator 202 driving a source-follower (NMOS transistor) N2. Two reference voltages $V_{REFH1}$ and $V_{REFL1}$ ($V_{REFH1} > V_{REFL1}$) can be input to the voltage generator 202 to set the high and low reference voltage and keep the DC level of the generator's output Vg between the two reference voltages. This, in turn, sets the DC level of the Vin' from the source-follower N2.

The second stage power converter 104 uses Vin' as its input to generate the output voltage Vout. The second stage power converter 104 includes a controller 204 that generates a control signal (e.g., pulse signal) 205 with a varying switching frequency $f_{SW}$ and a varying duty cycle based on the ratio of the desired Vout and the input Vin' in some embodiments. A duty cycle is the duration of the pulse relative to the total period. For example, the duty cycle can be Vout/Vin' when the output of the converter is locked. As Vin' increases, the duty cycle decreases, and as Vin' decreases, the duty cycle increases. Also, as Vin' increases, $f_{SW}$ increases, and as Vin' decreases, $f_{SW}$ decreases in some embodiments, to maintain the same output. The control signal 205 is sent to the pre-driver 206, which includes buffers 207 (e.g., inverters) and provides drive signals driver_high and driver_low that will drive the next stage driver, which is a half bridge driver 208.

The half bridge driver 208 includes a PMOS transistor P1 and an NMOS transistor N1, each driven by the driver_high and driver_low signals from the pre-driver 206 to provide a coil voltage $V_L$ at an inductor L. A coil current $I_L$ through the inductor L increases or decreases depending on the coil voltage $V_L$ as described below in FIG. 4. A capacitor C1 is coupled to the output voltage Vout. The Vout is fed back to the controller 204 through comparators 210 and 212. The comparators 210 and 212 each compares the Vout to a respective reference voltages $V_{REFH2}$ and $V_{REFL2}$ (where $V_{REFH2}>V_{REFL2}$) and provides a respective feedback signal to the controller 204 so that Vout can be kept between the two reference voltages $V_{REFH2}$ and $V_{REFL2}$. The controller 204 changes the switching frequency $f_{SW}$ and the duty cycle of the control signal 205 to keep Vout in the specified range. In some embodiments, a look-up table of a pre-programmed range of input values can be used to determine optimal switching frequencies and duty cycles for various applications. In some embodiments, Vout is lower than Vin.

Figure 2B:
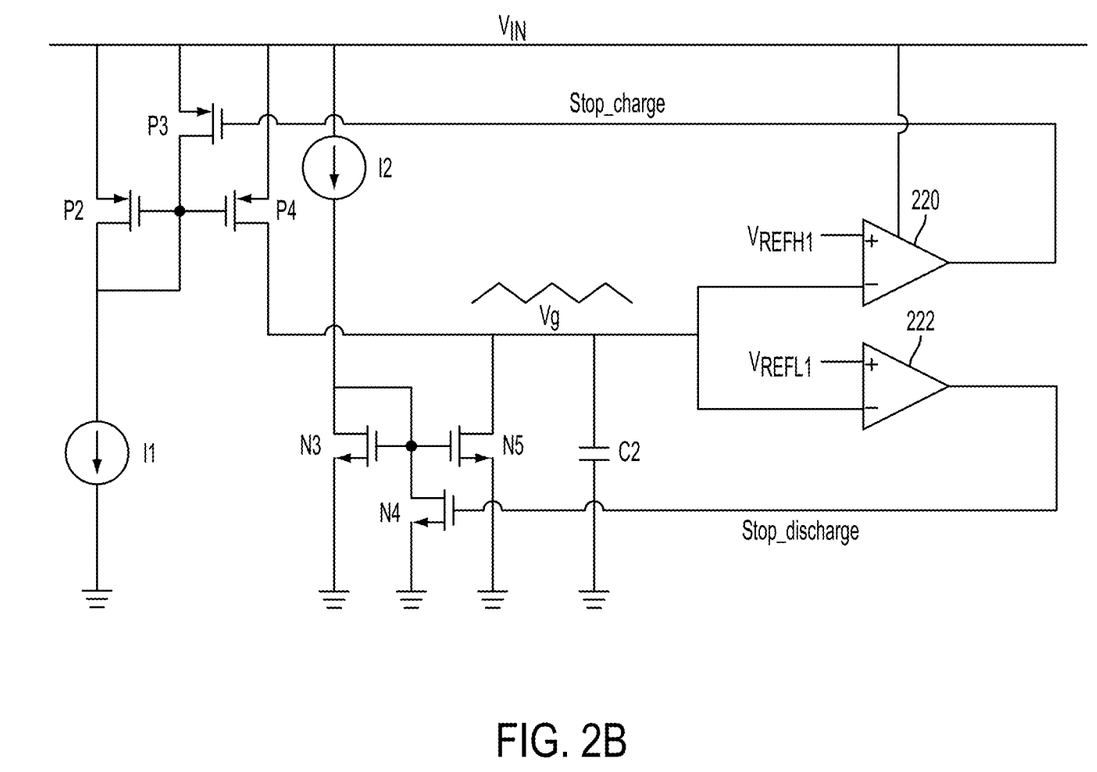
FIG. 2B is a schematic diagram of an exemplary voltage generator for the spread spectrum power converter in FIG. 2A according to some embodiments.

FIG. 2B is a schematic diagram of an exemplary voltage generator 202 for the spread spectrum power converter in FIG. 2A according to some embodiments. The exemplary voltage generator includes comparators 220 and 222 that compare the voltage generator output voltage Vg to two reference voltages $V_{REFH1}$ and $V_{REFL1}$ (where $V_{REFH1}>V_{REFL1}$), respectively.

If Vg is higher than $V_{REFH1}$ at the comparator 220, the comparator output Stop_charge signal becomes low to turn on a PMOS transistor P3. This will turn off PMOS transistors P2 and P4 to stop charging a capacitor C2 and Vg. The current source I1 keeps the current through the PMOS transistor P2 and P3 constant.

If Vg is lower than $V_{REFH1}$ at the comparator 222, the comparator output Stop_discharge signal becomes high to turn on an NMOS transistor N4. This will turn off NMOS transistors N3 and N5 to stop discharging the capacitor C2 and Vg. The current source I2 keeps the current through the NMOS transistor N3 and N4 constant.

In various embodiments, a voltage generator 202 can have either an analog or digital input to generate a voltage generator output Vg in accordance with the input, which can be a range of voltages (analog) or a set of codes (digital).

Figure 3:
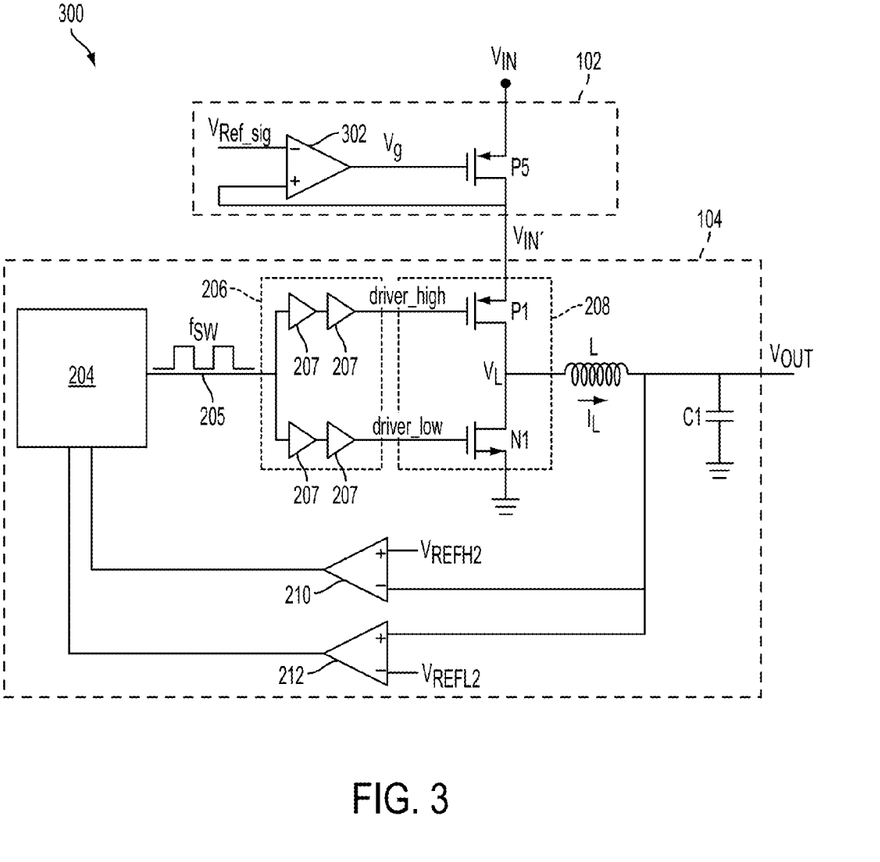
FIG. 3 is a schematic diagram of the exemplary spread spectrum power converter in FIG. 1 according to other embodiments.

FIG. 3 is a schematic diagram of the exemplary spread spectrum power converter in FIG. 1 according to other embodiments. The spread spectrum power converter 300 in FIG. 3 is similar to the spread spectrum power converter 200 in FIG. 2A except that the first stage voltage modulator 102 includes an operational amplifier 302 driving a PMOS transistor pass device P5. A reference signal Vref_sig is provided to the inverting input of the operational amplifier 302 and Vin' is feedback to the non-inverting input of the operational amplifier 302 for negative feedback. The PMOS transistor pass device P5 itself provides inversion and negative feedback.

The operational amplifier 302 provides the voltage generator output Vg to drive the pass device P5 such that Vin' follows Vref_sig. The embodiment using the operational amplifier 302 provides a faster response because it uses a closed loop negative feedback. Also, the pass device P5 has low drop out between Vin and Vin'. The reference signal Vref_sig is a varying signal, e.g., periodic or random, and the modulated signal Vin' is also a varying signal following Vin. The operation of the rest of the spread spectrum power converter 300 in FIG. 3 is similar to the spread spectrum power converter 200 in FIG. 2A as described above.

Figure 4:
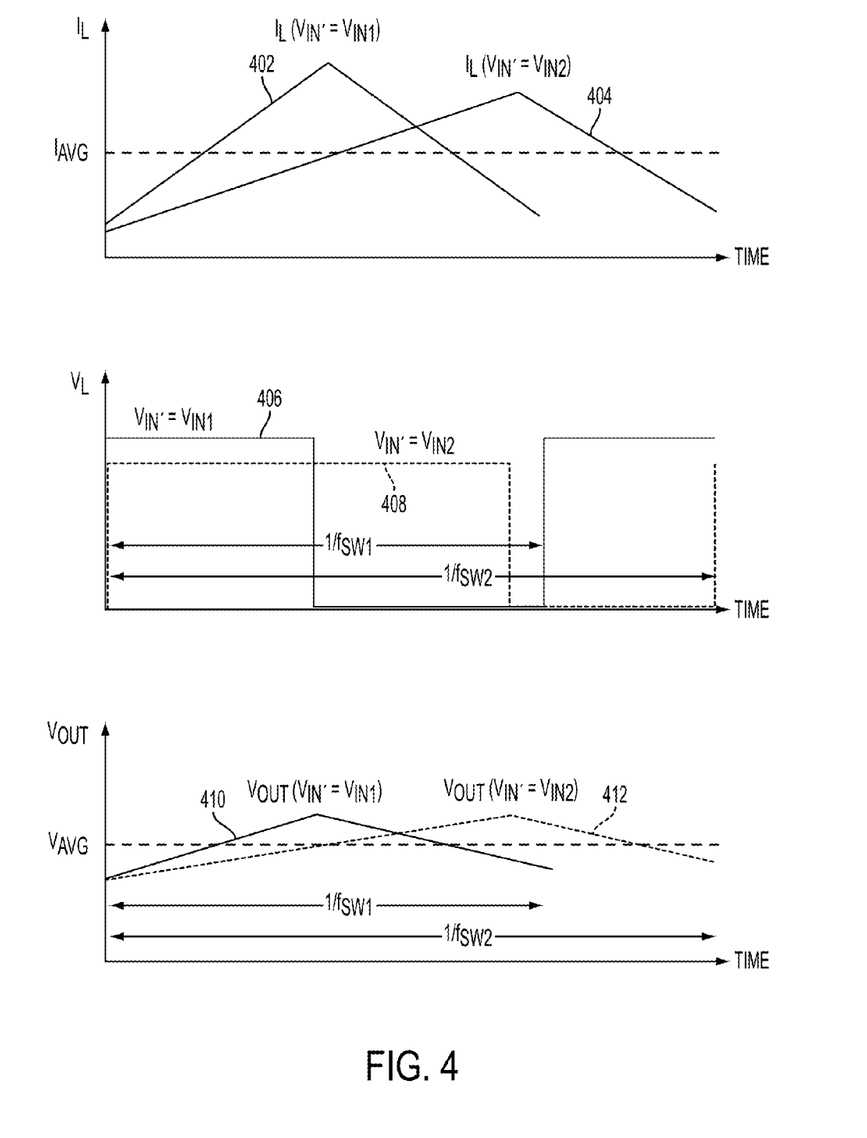
FIG. 4 is a plot of exemplary waveforms of the spread spectrum power converter in FIG. 2A according to some embodiments.

FIG. 4 is a plot of exemplary waveforms of the spread spectrum power converter in FIG. 2A according to some embodiments. The waveforms 402 and 404 represent the coil current $I_L$ through the inductor L when Vin' is Vin1 and Vin2 (Vin1>Vin2) respectively. $I_{avg}$ is the average value of the coil current $I_L$. As Vin' is modulated between Vin1 and Vin2, the $I_L$ varies between the two waveforms 402 and 404 depending on the value of Vin' at the time. The modulation of Vin' is slower than the switching frequency $f_{SW}$ of the control signal 205, which is also reflected in the coil voltage $V_L$ in waveforms 406 and 408.

The waveform 406 and 408 represent $V_L$ when Vin' is Vin1 and Vin2 (where Vin1>Vin2), respectively. As Vin' is modulated between Vin1 and Vin2, the $V_L$ signal changes between the two waveforms 406 and 408 and the switching frequency $f_{SW}$ also varies depending on the value of Vin' at the time. When Vin' is relatively high (Vin1), the switching frequency is fsw1. When Vin' is relatively low (Vin2), the switching frequency is fsw2. The switching frequency $f_{SW1}$ is higher than the switching frequency $f_{SW2}$ and the period $1/f_{SW1}$ is shorter than $1/f_{SW2}$, which is controlled by the control signal 205 from the controller 204. The variable switching frequency $f_{SW}$ of the spread spectrum power converter in FIG. 2A creates a frequency spreading effect in the output voltage Vout.

When Vin' is relatively high (Vin1), the current $I_L$ through the inductor increases at a faster rate when $V_L$ is directly connected to Vin', according to the equation $$V = L * \frac{dI_L}{dt},$$

where V is voltage across the inductor and L is the inductance. Because of the larger increase in $I_L$, the output capacitor C1 will be charged at a faster rate. Thus the voltage on C1 will reach the first threshold voltage $V_{REFH2}$ in a shorter amount of time. When Vin' is relatively low (Vin2), the current $I_L$ through the inductor increases at a slower rate when $V_L$ is directly connected to Vin'. Because of the smaller increase in $I_L$, the output capacitor C1 will be charged at a slower rate, and the voltage on C1 will reach $V_{REFH2}$ in a longer amount of time. Therefore modulating the supply voltage Vin' has the effect of elongating or shortening the period of time when $V_L$ is directly connected to Vin'. Thus the period and duty cycle of the second stage converter will vary based on the input voltage Vin'.

The waveforms 410 and 412 represent Vout when Vin' is Vin1 and Vin2 (where Vin1>Vin2), respectively. $V_{avg}$ is the average value of Vout. Vin' is modulated between Vin1 and Vin2, Vout changes between the two waveforms 410 and 412 depending on the value of Vin' at the time. The switching frequency $f_{SW1}$ is higher than the switching frequency $f_{SW2}$ and the period $1/f_{SW1}$ is shorter than $1/f_{SW2}$, which is controlled by the control signal 205 from the controller 204.

Figure 5A:
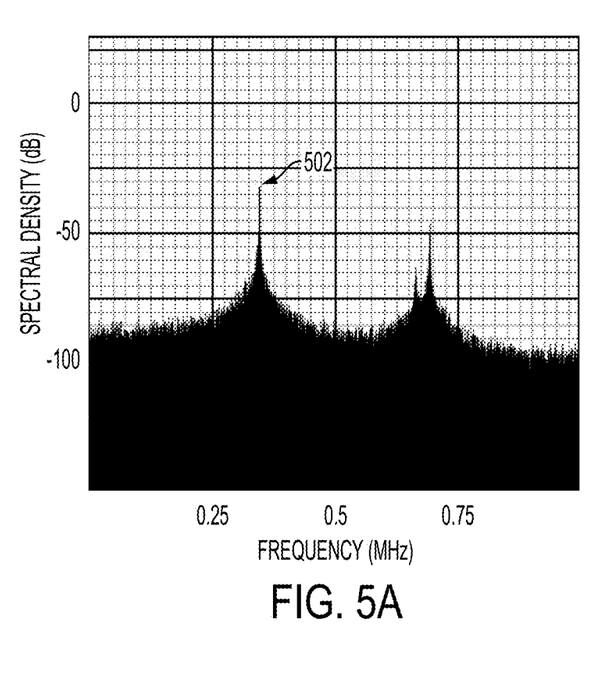
FIG. 5A is a spectrum plot of Vout from an exemplary conventional power converter.
Figure 5B:
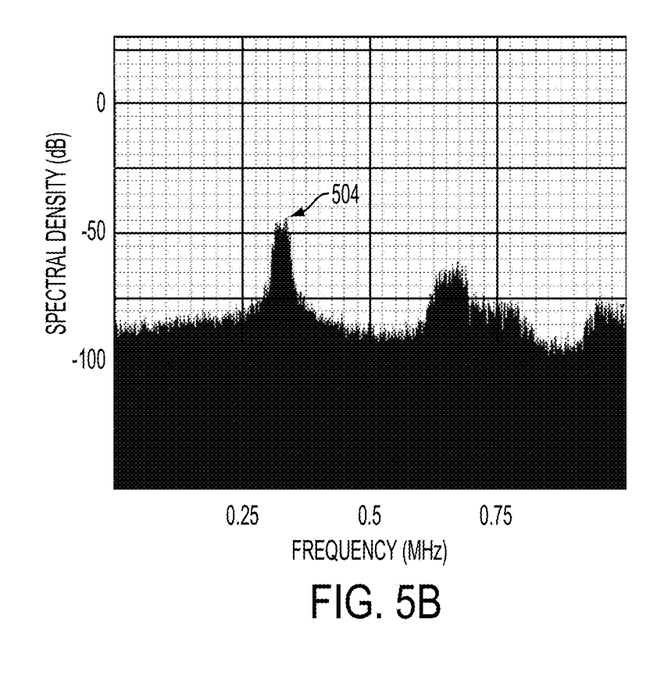
FIG. 5B is a spectrum plot of Vout from the exemplary spread spectrum power converter in FIG. 2A according to some embodiments.

FIG. 5A is a spectrum plot of Vout from an exemplary conventional power converter. FIG. 5B is a spectrum plot of Vout from the exemplary spread spectrum power converter in FIG. 2A according to some embodiments. A noise peak 502 at $f_{SW}$ is about −30 dB, while a noise peak 504 at the same frequency is at about −45 dB. The magnitude difference in noise peaks between a conventional power converter and the exemplary spread spectrum power converter in FIG. 2A is about 15 dB. This is about 5.6 times noise peak deduction for the exemplary spread spectrum power converter in FIG. 2A. Also, noise peaks that happen at harmonics of the switching frequency $f_{SW}$, such as $2 \cdot f_{SW}$, $3 \cdot f_{SW}$, etc., are also reduced.

The reduced noise peaks from the spread-spectrum power converter in FIG. 2A result from the variable switching frequency $f_{SW}$. By spreading the frequency component across a band of frequencies around a certain $f_{SW}$ (e.g., $f_{SW1}$-$f_{SW2}$), it decreases the EMI noise caused by the switching of the power converter, and makes the system easier to design. For example, fewer filters and snubbers need to be used to suppress the interference and noise. It also reduces the complexity of EMI sensitive systems and their bill of materials (BOM), thus the implementation cost is saved.

Figure 6:
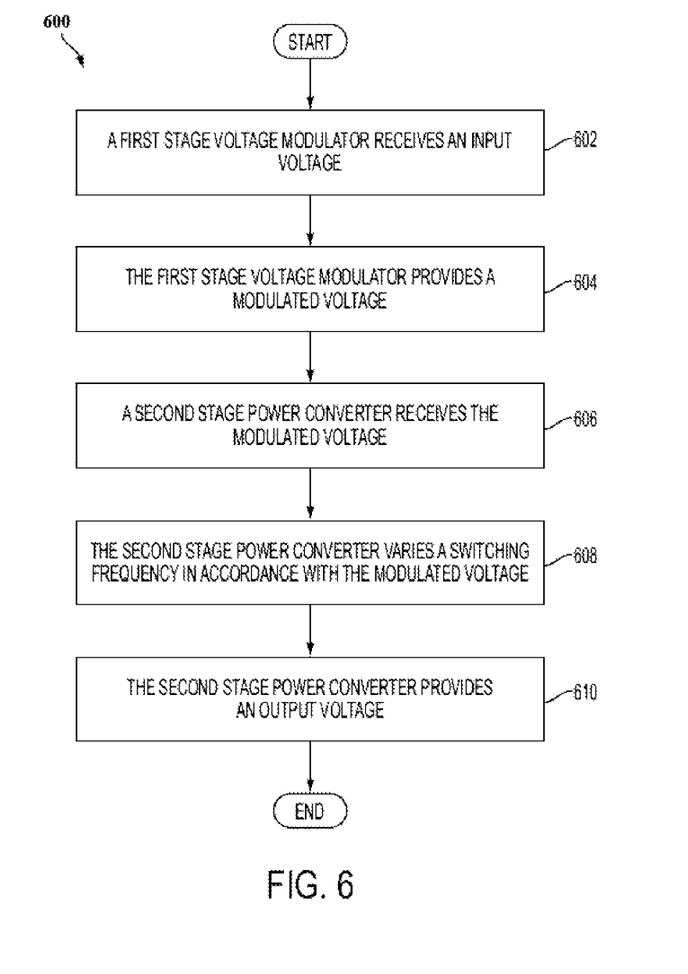
FIG. 6 is a flowchart of a method for the exemplary spread spectrum power converter in FIG. 1, FIG. 2A, and FIG. 3 according to some embodiments.

FIG. 6 is a flowchart of a method 600 for the exemplary spread spectrum power converter in FIG. 1, FIG. 2A, and FIG. 3 according to some embodiments. At step 602, a first stage voltage modulator receives an input voltage. At step 604, the first stage voltage modulator provides a modulated voltage. At step 606, a second stage power converter receives the modulated voltage. At step 608, the second stage power converter varies a switching frequency in accordance with the modulated voltage. At step 610, the second stage power converter provides an output voltage.

In various embodiments, a voltage generator drives a source follower in the first stage voltage modulator. Two comparators in the voltage generator receive two reference voltages respectively. Each comparator compares the respective reference voltage and a voltage generator output from the voltage generator. The voltage generator output is maintained between the two reference voltages. A voltage generator output value from the voltage generator is maintained between the two reference voltages using the two comparators. In some embodiments, an operational amplifier drives a pass device in the first stage voltage modulator.

In various embodiments, a controller in the second stage power converter provides a control signal having the varying switching frequency. A pre-driver in the second stage power converter receives the control signal. The pre-driver provides drive signals to a next stage driver. The output voltage is coupled across a capacitor in the second stage power converter and an inductor is coupled to the capacitor. Two comparators coupled to the output voltage receive a respective reference voltage for comparison. Each of the two comparators supplies a respective feedback signal to the controller.

In various embodiments, the second stage power converter changes the duty cycle and frequency of the control signal based on the modulated voltage. The modulated signal is modulated with a modulation frequency relatively lower than the switching frequency.

According to some embodiments, a power converter includes a first stage voltage modulator configured to receive an input voltage and provide a modulated voltage. A second stage power converter is configured to receive the modulated voltage and vary a switching frequency of the second stage power converter in accordance with the modulated voltage to provide an output voltage.

According to some embodiments, a method for a power converter includes a first stage voltage modulator receiving an input voltage. The first stage voltage modulator provides a modulated voltage. A second stage power converter receives the modulated voltage. The second stage power converter varies a switching frequency in accordance with the modulated voltage. The second stage power converter provides an output voltage.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps that perform substantially the same function or achieve substantially the same result as the corresponding embodiments described herein may be utilized according to the present disclosure.

The above method embodiment shows exemplary steps, but they are not necessarily required to be performed in the order shown. Steps may be added, replaced, changed order, and/or eliminated as appropriate, in accordance with the spirit and scope of embodiment of the disclosure. Embodiments that combine different claims and/or different embodiments are within the scope of the disclosure and will be apparent to those skilled in the art after reviewing this disclosure.

What is claimed is:

1. A power converter, comprising:
a first stage voltage modulator comprising a switching device, the first stage voltage modulator configured to receive an input voltage and provide a modulated voltage at a terminal of the switching device, the modulated voltage being less than or equal to the input voltage; and
a second stage power converter configured to receive the modulated voltage and vary a switching frequency of the second stage power converter based on the received modulated voltage to provide an output voltage, wherein the second stage power converter is configured to vary the switching frequency such that a modulation frequency of the modulated voltage is lower than the switching frequency.

2. The power converter of claim 1, wherein
the switching device is a source follower, and
the first stage voltage modulator comprises a voltage generator coupled to the source follower.

3. The power converter of claim 2, wherein the voltage generator comprises two comparators receiving two reference voltages, each comparator receives a respective reference voltage, and the voltage generator is configured to provide a voltage generator output having a value between the two reference voltages.

4. The power converter of claim 1, wherein the first stage voltage modulator comprises an operational amplifier coupled to the switching device and the operational amplifier is configured to receive a varying reference signal as one input, and the modulated voltage from the first stage voltage modulator as another input.

5. The power converter of claim 1, wherein the second stage power converter comprises a controller configured to provide a control signal having the varying switching frequency.

6. The power converter of claim 5, wherein the second stage power converter further comprises a pre-driver configured to receive the control signal and provide drive signals to a next stage driver.

7. The power converter of claim 6, wherein the next stage driver comprises a half bridge driver.

8. The power converter of claim 5, wherein the second stage power converter further comprises two comparators coupled to the output voltage, each comparator receiving a respective reference voltage for comparison to supply a respective feedback signal to the controller.

9. The power converter of claim 5, wherein the controller is configured to change the duty cycle and the switching frequency of the control signal based on the modulated voltage.

10. The power converter of claim 1, wherein the second stage power converter further comprises an inductor coupled to a capacitor and the output voltage is coupled across the capacitor.

11. A method for operating a power converter, comprising:
   a first stage voltage modulator receiving an input voltage;
   the first stage voltage modulator providing a modulated voltage at a terminal of a switching device, the modulated voltage being less than or equal to the input voltage;
   a second stage power converter receiving the modulated voltage from the switching device;
   the second stage power converter varying a switching frequency based on the received modulated voltage; and
   the second stage power converter providing an output voltage,
   wherein the modulated voltage has a modulation frequency lower than the switching frequency.

12. The method of claim 11, further comprising an operational amplifier driving the switching device in the first stage voltage modulator.

13. The method of claim 11, further comprising a voltage generator driving the switching device in the first stage voltage modulator, the switching device being a source follower.

14. The method of claim 13, further comprising:
   two comparators in the voltage generator receiving two reference voltages, respectively;
   each comparator comparing the respective reference voltage and a voltage generator output from the voltage generator; and
   maintaining the voltage generator output between the two reference voltages.

15. The method of claim 11, further comprising a controller in the second stage power converter providing a control signal having the varying switching frequency.

16. The method of claim 15, further comprising:
   a pre-driver in the second stage power converter receiving the control signal; and
   the pre-driver providing drive signals to a next stage driver.

17. The method of claim 15, further comprising:
   each comparator of two comparators coupled to the output voltage receiving a respective reference voltage for comparison; and
   the two comparators supplying respective feedback signals to the controller.

18. The method of claim 15, further comprising the controller changing the duty cycle and the switching frequency of the control signal based on the modulated voltage.

19. A power converter, comprising:
   a first stage voltage modulator including a voltage generator coupled to a source follower, wherein the first stage voltage modulator is configured to receive an input voltage and provide a modulated voltage; and
   a second stage power converter including a controller, the controller configured to provide a control signal having a varying duty cycle and a varying switching frequency in accordance with the modulated voltage, wherein the second stage power converter is configured to receive the modulated voltage and provide an output voltage,
   wherein the modulated voltage is modulated with a modulation frequency lower than the switching frequency.

* * * * *